(12) United States Patent
Davies et al.

(10) Patent No.: US 11,580,186 B2
(45) Date of Patent: Feb. 14, 2023

(54) REDUCING LATENCY OF DIGITAL CONTENT DELIVERY OVER A NETWORK

(71) Applicant: Google LLC, Mountain View, CA (US)

(72) Inventors: Scott Tadashi Davies, Santa Monica, CA (US); Justin Lewis, Marina del Rey, CA (US)

(73) Assignee: Google LLC, Mountain View, CA (US)

(*) Notice: Subject to any disclaimer, the term of this patent is extended or adjusted under 35 U.S.C. 154(b) by 798 days.

(21) Appl. No.: 15/182,118

(22) Filed: Jun. 14, 2016

(65) Prior Publication Data

US 2017/0357728 A1    Dec. 14, 2017

(51) Int. Cl.
| | |
|---|---|
| *G06F 16/957* | (2019.01) |
| *G06F 16/93* | (2019.01) |
| *G06F 16/248* | (2019.01) |
| *G06F 16/9535* | (2019.01) |
| *G06F 16/958* | (2019.01) |

(Continued)

(52) U.S. Cl.
CPC ........ *G06F 16/9574* (2019.01); *G06F 16/248* (2019.01); *G06F 16/93* (2019.01); *G06F 16/9535* (2019.01); *G06F 16/972* (2019.01); *G06F 21/6218* (2013.01)

(58) Field of Classification Search
CPC ......... G06F 17/30011; G06F 17/30554; G06F 17/30893; G06F 17/30902; G06F 17/30867; G06F 21/6218; G06F 16/972; G06F 16/9535; G06F 16/93; G06F 16/248; G06F 16/9574; G06F 16/9538; G06F 16/951
See application file for complete search history.

(56) References Cited

U.S. PATENT DOCUMENTS

| | | | |
|---|---|---|---|
| 6,112,202 A | * | 8/2000 | Kleinberg ......... G06F 17/30864 |
| 6,336,112 B2 | * | 1/2002 | Chakrabarti ...... G06F 17/30873 |
| 6,405,221 B1 | | 6/2002 | Levine et al. |

(Continued)

FOREIGN PATENT DOCUMENTS

CN    104067274    9/2014

OTHER PUBLICATIONS

Written Opinion issued in International Application No. PCT/US2016/062542, dated May 7, 2018, 7 pages.

(Continued)

*Primary Examiner* — Miranda Le
(74) *Attorney, Agent, or Firm* — Fish & Richardson P.C.

(57) ABSTRACT

A system including an electronic document inspection device that identifies a set of electronic documents using a search query; a composite page generator that generates a composite page that i) is hosted by a different domain than at least some electronic documents in the set of electronic documents and ii) includes electronic documents from the set of electronic documents; an asset package generator that generates digital content asset packages, each digital content asset package including i) digital content assets and ii) instructions that specify a configuration of the digital content assets for the respective digital content asset package; and an asset package list generator that generates a digital content asset package list specifying an order of presentation of the digital content asset packages, wherein the composite page, the digital content asset packages, and the digital content asset package list are transmitted to a user device that provides the search query.

16 Claims, 8 Drawing Sheets

(51) Int. Cl.
*G06F 16/9538* (2019.01)
*G06F 21/62* (2013.01)

(56) References Cited

U.S. PATENT DOCUMENTS

| | | | | |
|---|---|---|---|---|
| 6,636,854 | B2* | 10/2003 | Dutta | G06F 17/30206 |
| 7,062,487 | B1* | 6/2006 | Nagaishi | G06F 16/35 |
| | | | | 707/737 |
| 7,103,594 | B1* | 9/2006 | Wolfe | G06F 16/338 |
| | | | | 707/706 |
| 7,421,454 | B2* | 9/2008 | DeShan | G06Q 30/02 |
| 7,617,176 | B2* | 11/2009 | Zeng | G06F 17/30864 |
| 7,716,198 | B2* | 5/2010 | Meyerzon | G06F 17/30684 |
| | | | | 707/706 |
| 7,917,493 | B2* | 3/2011 | Vailaya | G06F 17/30675 |
| | | | | 707/711 |
| 8,032,519 | B2* | 10/2011 | Groeneveld | G06F 16/345 |
| | | | | 707/713 |
| 8,397,159 | B2 | 3/2013 | Ji et al. | |
| 8,838,736 | B2* | 9/2014 | Swahn | G06F 3/04817 |
| | | | | 709/217 |
| 9,043,228 | B1 | 5/2015 | Ross, Jr. et al. | |
| 9,280,603 | B2* | 3/2016 | Carson | G06F 16/24578 |
| 9,299,030 | B1* | 3/2016 | Hotchkies | G06F 16/9574 |
| 9,323,862 | B2* | 4/2016 | Fiatal | G06F 16/9574 |
| 9,411,830 | B2* | 8/2016 | Mei | G06F 3/0488 |
| 2002/0073075 | A1 | 6/2002 | Dutta et al. | |
| 2004/0103090 | A1* | 5/2004 | Dogl | G06F 17/30643 |
| 2005/0021822 | A1* | 1/2005 | Cherkasova | H04L 29/06027 |
| | | | | 709/232 |
| 2006/0277167 | A1* | 12/2006 | Gross | G06F 16/9577 |
| 2008/0114755 | A1* | 5/2008 | Wolters | G06F 17/30873 |
| 2008/0235107 | A1* | 9/2008 | Nagarajayya | G06Q 30/00 |
| | | | | 705/26.3 |
| 2008/0263033 | A1 | 10/2008 | Vailaya et al. | |
| 2009/0043757 | A1* | 2/2009 | Corbitt | G06F 16/954 |
| 2009/0106070 | A1 | 4/2009 | Konar | |
| 2009/0106087 | A1 | 4/2009 | Konar | |
| 2009/0172514 | A1* | 7/2009 | Radovanovic | G06F 16/951 |
| | | | | 715/212 |
| 2010/0228744 | A1* | 9/2010 | Craswell | G06F 16/9577 |
| | | | | 707/751 |
| 2010/0287162 | A1* | 11/2010 | Shirwadkar | G06F 17/2785 |
| | | | | 707/740 |
| 2011/0251902 | A1* | 10/2011 | Nagarajayya | G06Q 30/02 |
| | | | | 705/14.71 |
| 2011/0295830 | A1 | 12/2011 | Swahn | |
| 2011/0313843 | A1 | 12/2011 | Rounthwaite et al. | |
| 2013/0007004 | A1* | 1/2013 | Rai | G06F 17/30622 |
| | | | | 707/742 |
| 2013/0054562 | A1* | 2/2013 | Bennett | G06F 17/30277 |
| | | | | 707/710 |
| 2013/0097029 | A1 | 4/2013 | Mhatre et al. | |
| 2013/0124342 | A1 | 5/2013 | Virkar et al. | |
| 2014/0059419 | A1* | 2/2014 | Devries | G06F 17/30864 |
| | | | | 715/233 |
| 2014/0089080 | A1 | 3/2014 | Tajima et al. | |
| 2014/0321761 | A1* | 10/2014 | Wang | G06K 9/00677 |
| | | | | 382/218 |
| 2015/0206199 | A1 | 7/2015 | Zhang | |

OTHER PUBLICATIONS

International Search Report and Written Opinion issued in International Application No. PCT/US2016/062542, dated Feb. 13, 2017, 13 pages.

CN Office Action in Chinese Application No. 2020122802013300, dated Dec. 31, 2020, 9 pages (with English translation).

EP Office Action in European Application No. 16810142.6, dated Jan. 19, 2021, 35 pages.

EP Office Action in European Application No. 16810142, dated Mar. 17, 2020, 8 pages.

CN Office Action in Chinese Application No. 201611235250.9, dated Mar. 10, 2020, 19 pages (with English translation).

EP Office Action in European Application No. 16810142.6, dated Jul. 20, 2020, 6 pages.

* cited by examiner

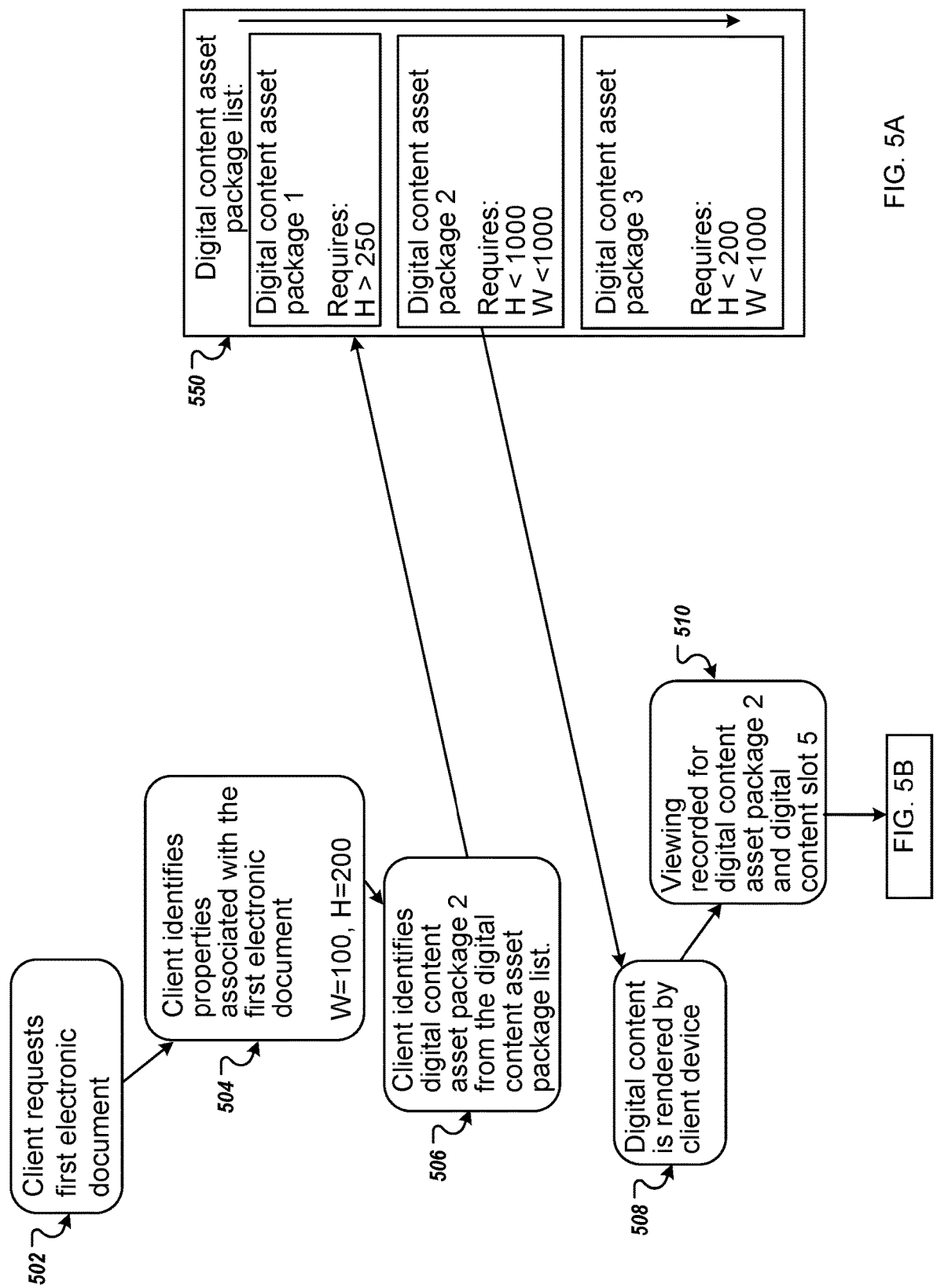

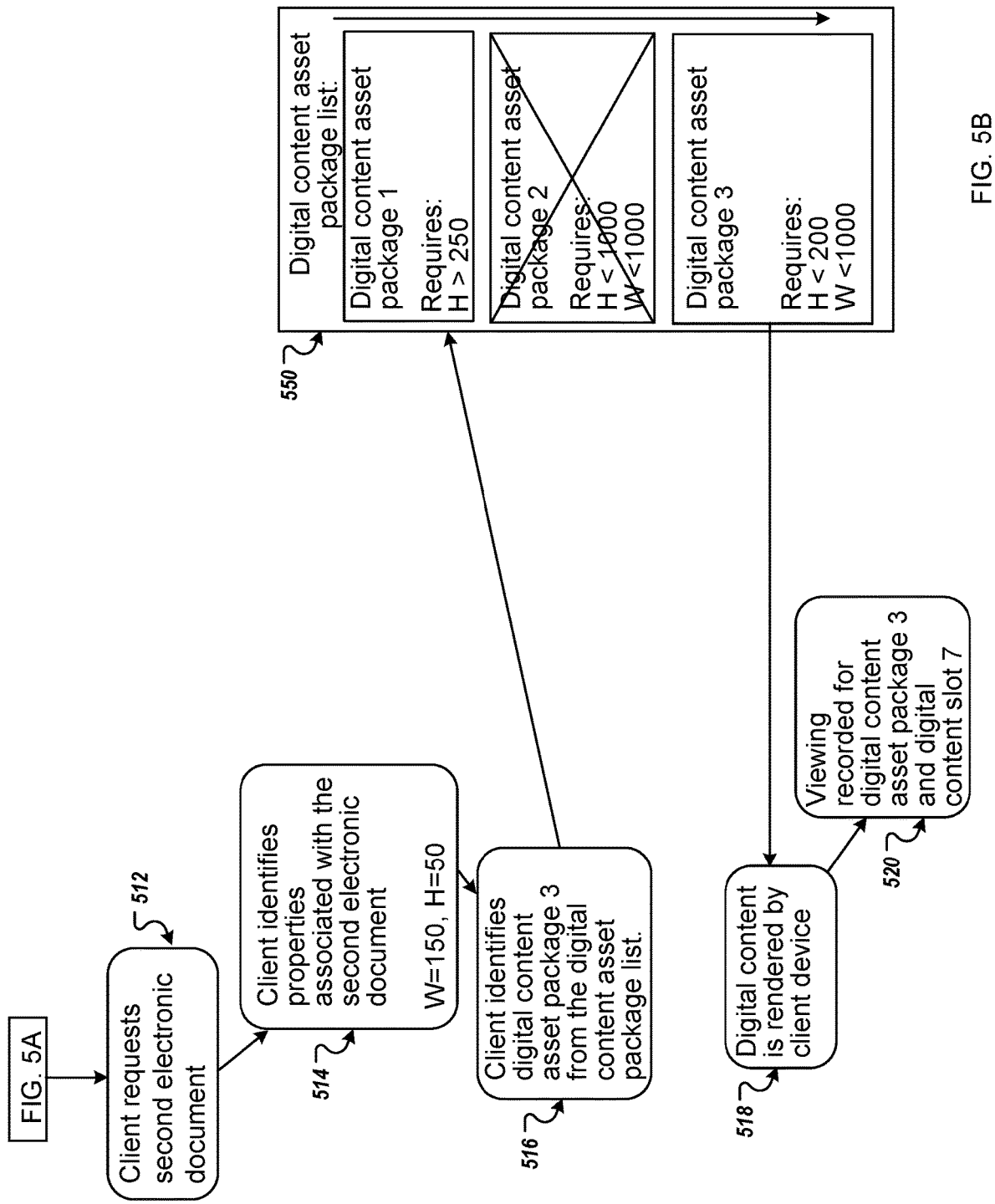

REDUCING LATENCY OF DIGITAL CONTENT DELIVERY OVER A NETWORK

BACKGROUND

This document discloses distribution of digital content to a client computing device. For example, a large amount of digital content is distributed to portable computing devices, such as mobile phones, tablet devices, and other portable computing devices. Often, the digital content distributed to these portable devices is transmitted over wireless connections, including mobile phone networks (e.g., cellular communications networks).

SUMMARY

Innovative aspects of the subject matter described in this specification may be embodied in systems that include an electronic document inspection device that identifies a set of electronic documents using a search query; a composite page generator that generates a composite page that i) is hosted by a different domain than at least some electronic documents in the set of electronic documents and ii) includes various electronic documents from the set of electronic documents; an asset package generator that generates one or more digital content asset packages, each digital content asset package including i) digital content assets and ii) one or more instructions that specify a configuration of the digital content assets for the respective digital content asset package; and an asset package list generator that generates a digital content asset package list that specifies an order of presentation of the one or more digital content asset packages, wherein the composite page, the one or more digital content asset packages, and the digital content asset package list are transmitted to a given user device that provides the search query.

These and other embodiments may each optionally include one or more of the following features. For instance, for each digital content asset package, the one or more instructions that specify the configuration of the digital content assets are based on a size, a location, or both, of a digital content slot of a particular electronic document of the set of electronic documents that includes a composite digital content that is based on one or more of the respective digital content assets. For each digital content asset package, the one or more instructions that specify the configuration of the digital content assets include a set of one or more presentation sizes that a composite digital content based one or more of the respective digital content assets is available for inclusion within a digital content slot of a particular electronic document of the set of electronic documents. For each digital content asset package further includes an identifying element that uniquely identifies a composite digital content that is based on one or more of the respective digital content assets.

Innovative aspects of the subject matter described in this specification may be embodied in methods that include the actions of receiving, by one or more servers and from a given client device, a search query; identifying, by the one or more servers, a set of electronic documents using the search query; generating, by the one or more servers, a composite page that i) is hosted by a different domain than at least some electronic documents in the set of electronic documents and ii) includes various electronic documents from the set of electronic documents; generating, by the one or more servers, one or more digital content asset packages, each digital content asset package including i) digital content assets and ii) one or more instructions that specify a configuration of the digital content assets for the respective digital content asset package; generating, by the one or more servers, a digital content asset package list that specifies an order of presentation of the one or more digital content asset packages; and in response to the search query, transmitting, by the one or more servers and to the given client device, the composite page, the one or more digital content asset packages, and the digital content asset package list.

Other embodiments of these aspects include corresponding systems, apparatus, and computer programs, configured to perform the actions of the methods, encoded on computer storage devices.

These and other embodiments may each optionally include one or more of the following features. For instance, for each digital content asset package, the one or more instructions that specify the configuration of the digital content assets are based on a size, a location, or both, of a digital content slot of a particular electronic document of the set of electronic documents that includes a composite digital content that is based on one or more of the respective digital content assets. For each digital content asset package, the one or more instructions that specify the configuration of the digital content assets include a set of one or more presentation sizes that a composite digital content based one or more of the respective digital content assets is available for inclusion within a digital content slot of a particular electronic document of the set of electronic documents. Each digital content asset package further includes an identifying element that uniquely identifies a composite digital content that is based on one or more of the respective digital content assets. Receiving, by the one or more servers and from the given client device, data indicating i) the identifying element and ii) one or more properties of a particular electronic document of the set of electronic documents associated with a display of the composite digital content. The one or more properties include a size, location, or both, of the composite digital content that is included within a digital content slot of the particular electronic document. Modifying a log based on receiving the data indicating i) the identifying element and ii) the one or more properties of the particular electronic document associated with the display of the composite digital content.

Particular implementations of the subject matter described in this specification can be implemented so as to realize one or more of the following advantages. Implementations of the present disclosure provide maintaining the user within a single application (e.g., a digital content discovery application) to improve the user experience by reducing the transition time of switching between digital content. Further, navigation by the user to other pieces of digital content (e.g., other search results) are improved, and made visually seamless. Moreover, maintaining the user within a single application ensures the user will continue browsing new digital content from the application as opposed to transitioning to other applications. Additionally, maintaining the user within the single application prevents exposure of unwanted security risks.

Moreover, latencies caused by making multiple requests for digital content over a network are reduced by aggregating digital content from multiple different digital content sources (e.g., servers) into a single document (e.g., web page). For example, the number of client initiated network calls (or requests) required to render and present the single document containing the aggregated digital content at the client will generally be lower than the number of network calls the client would need to make to separately obtain, render, and present the content from each of the different digital content sources. Each network call that is required contributes to the total amount of time required to obtain, render, and present the digital content, and therefore increases the latency experienced following a user request for digital content.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

FIGS. 5A, 5B illustrates an example process for distribution of digital content assets based on a digital content asset package list.

DETAILED DESCRIPTION

This document describes methods, systems, and computer readable medium that facilitate lower latency delivery of digital content assets over a network. For example, systems described herein receive a search query from a client device. The system identifies a set of electronic documents using the search query and generates a composite page that is hosted by a different domain than at least some electronic documents in the set of electronic documents and includes various electronic documents from the set of electronic documents. The system further generates digital content asset packages that each include digital content assets and instructions that specify a configuration of the digital content assets for the respective digital content asset package. The system generates a digital content asset package list that specifies an order of presentation of the digital content asset packages. In response to the search query, the system transmits the composite page, the digital content asset packages, and the digital content asset package list to the client device. Generating and distributing digital content in this manner reduces the latency associated with the delivery of the digital content.

Figure 1:
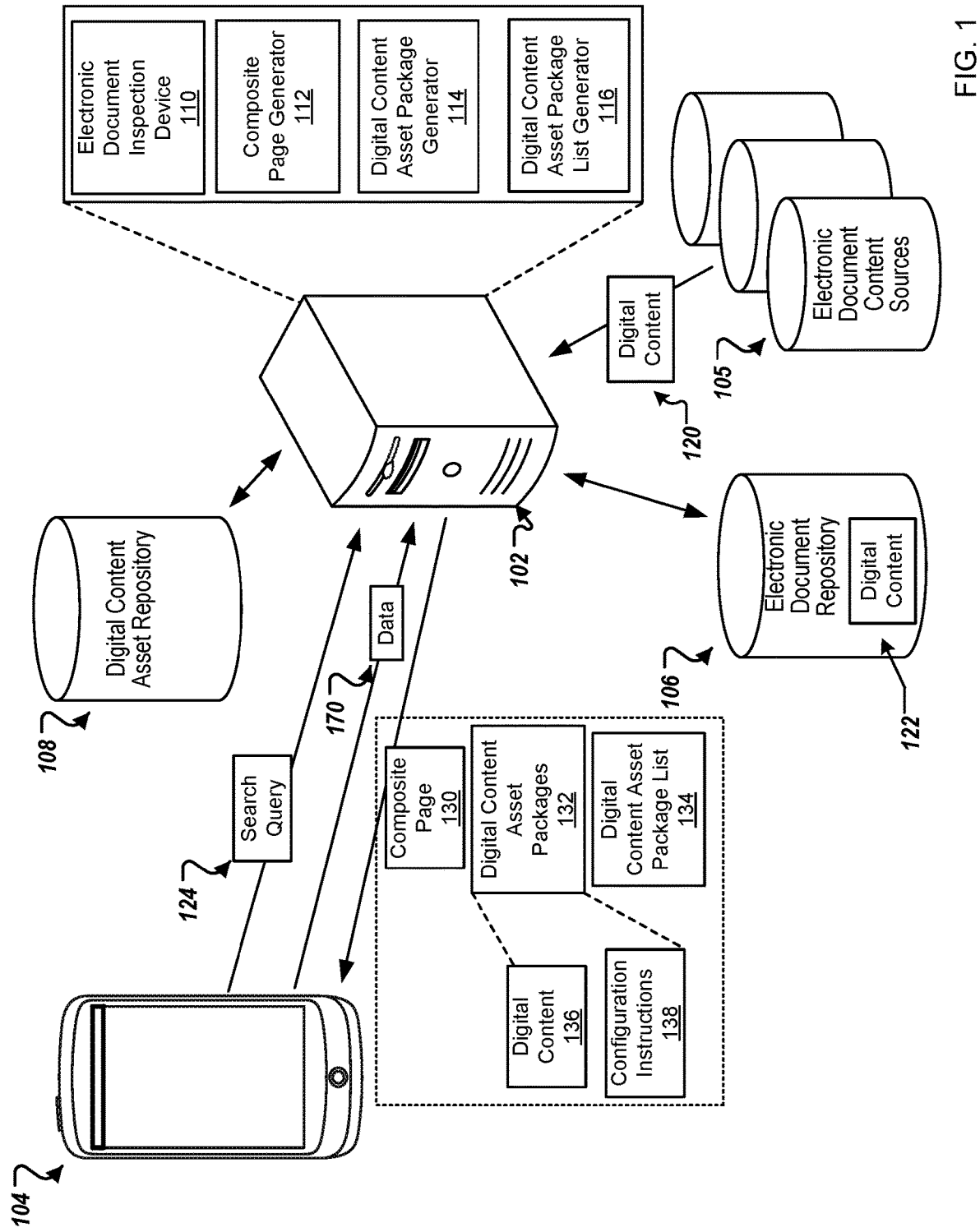
FIG. 1 illustrates an environment for distribution of digital content assets.

FIG. 1 illustrates an environment 100 for distribution of digital content assets. The environment 100 includes a server computing system 102, a client computing device 104, electronic document content sources 105, an electronic document repository 106, and a digital content asset repository 108. The server computing system 102 includes an electronic document inspection device 110, a composite page generator 112, a digital content asset package 114, and a digital content asset package list generator 116. The client computing device 104 is in communication with the server computing system 102 over one or more networks. The server computing system 102 is in communication with the electronic document content sources 105, the electronic document repository 106, and the digital content asset repository 108 over one or more networks.

In some implementations, the server computing system 102, and in particular, the electronic document inspection device 110, electronically crawls the electronic document content sources 105 and stores various digital content, e.g., digital content of electronic documents, from the various electronic document content sources 105. Specifically, the electronic document inspection device 110 crawls the electronic document content sources 105 to identify electronic document digital content 120. The electronic document inspection device 110 fetches the electronic document digital content 120 from the electronic document content sources 105 and the server computing system 102 stores the electronic document digital content 120 at the electronic document repository 106 as stored electronic document digital content 122. In some examples, the stored electronic document digital content 122 is a cached version of the electronic document digital content 120.

In some examples, the electronic document inspection 110 crawls and obtains the electronic document digital content 120 from the electronic document content sources 105 at any time, including continuously, at discrete intervals, and/or in response to a request. In some examples, the electronic document inspection 110 crawls and obtains the electronic document digital content 120 from the electronic document content sources 105 prior to receiving a search query related to the electronic document digital content 120. In some examples, the electronic document inspection device 110 crawls and obtains the electronic document digital content 120 from the electronic document content sources 105 in response to receiving a search query related to the electronic document digital content 120.

In some examples, when the electronic document inspection device 110 obtains the electronic document digital content 120 from the electronic document content sources 105, the obtained electronic document digital content 120 includes a complete version of the electronic document digital content 120. That is, the electronic document digital content 120 can include an entirety of the electronic document digital content 120 (including relevant formatting data) as provided (and/or generated) by the electronic document content sources 105 that would be displayed and hosted at a domain associated with the appropriate electronic document content source 105. In some examples, the electronic document digital content 120 is associated with an accelerated mobile pages (AMP) format.

The server computing system 102 can receive a search query 124, e.g., from the client computing device 104, over one or more networks. The search query 124 can include a textual query, a visual query, an audio query, or a combination thereof. In some examples, the server computing system 102 receives a network call for digital content from the client computing device 104. That is, the search query 124 can include a network call.

The server computing system 102, and specifically, the electronic document inspection device 110, identifies a set of electronic documents using the search query 124. The electronic document inspection device 110 accesses the electronic document digital content 122 stored by the electronic document repository 108 (and that was obtained from the electronic document content sources 105) to identify a set of electronic documents that are responsive to the search query 124. The set of the electronic documents can be determined to be responsive to the search query 124 based on one or more factors, including keywords, meta-information, and other information that is indicative of the content included in the electronic documents.

In some examples, based on the received network call, e.g., the search query 124, the electronic document inspection device 110 identifies various portions of the electronic document digital content 122, e.g., the set of electronic documents. The various portions of the electronic document digital content 122 are available to be presented on differing electronic documents that are linked to a set of search results that are provided in response to the search query 124, as described further below.

In some implementations, the server computing system 102, and in particular, the composite page generator 112, generates a composite page 130. In some examples, the composite page 130 is i) hosted at a different domain than at least some electronic documents in the set of the electronic documents and ii) includes various electronic documents from the set of electronic documents. The composite page 130 can be hosted at a domain (e.g., example.com) that differs from the domains associated with the set of the electronic documents (e.g., domains associated with the electronic document content sources 105). Further, the electronic documents included by the initial version of the composite page 130 provides for display a portion (or snippet) of the electronic documents that are identified as responsive to the search query 124. For example, the initial version of the composite page 130 can include search results that each include a snippet of the corresponding electronic document.

In some examples, the composite page 130 initially hides presentation of at least some of the electronic documents. However, for each displayed snippet of the electronic document of the composite page 130, the composite page 130 includes corresponding electronic document digital content 122 that is hidden from an initial display of the composite page 130. That is, the initial version of the composite page 130 i) can display a snippet of the electronic document digital content 122 that is different than the complete electronic document digital content 122 and ii) and can include the complete electronic document digital content 122 hidden from the initial version of the composite page 130. In some examples, the composite page generator 130 additionally identifies various different formatting that is capable of being applied to the various portions of the electronic document digital content 122 when presented, e.g., by the client computing device 104, with different electronic document digital content 122 linked to by the set of search results that are provided as responsive to the search query 124.

In some implementations, the server computing system 102, and specifically, the digital content asset package generator 114, generates digital content asset packages 132. Specifically, each of the digital content asset packages 132 can include digital content assets 136 and instructions 138 that specify a configuration of the digital content assets 136 for the respective digital content asset package 132. The digital content asset package generator 114 accesses the digital content asset repository 108 to identify the digital content assets 136. In some examples, the digital content assets 136 can be determined to be responsive to the search query 124 based on one or more criteria that are associated with the content assets 136, including keywords, meta-information, and other information that are indicative of the subject matter of the content assets 136. In some examples, the digital content assets 136 include text, image, and/or video. In some examples, the digital content asset packages 132 include a plurality of digital content asset packages 132.

In some examples, one or more of the plurality of digital content assert packages 132 are associated with at least a portion of the same digital content assets 136. That is, at least a portion of the digital content assets 136 can be associated with two or more digital content asset packages 132.

In some examples, the instructions 138 for a particular digital content asset package 132 specify a configuration of the digital content assets 136 for the particular digital content asset package 132. Specifically, the instructions 138 specify the configuration of the digital content assets 136 for a i) selection of a subset of the digital content assets 136 (in some examples, including each of the digital content assets 136) and ii) positioning (or arrangement) of the digital content assets 136 within a particular electronic document (or a portion of the particular electronic document) of the set of electronic documents. In some examples, the instructions 138 enable the client computing device 104 to format various portions of the digital content assets 136 according to various differing formats.

In some examples, the instructions 138 for a particular digital content asset package 132 specifies that the configuration of the digital content assets 136 for the particular digital content asset package 132 are based on a size, a location, or both, of a digital content slot of the particular electronic document. For instance, the digital content slot can present a composite digital content that is generated based on the appropriate digital content assets 136 (e.g., as specified by the instructions 138). That is, the composite digital content can include a specific subset of the digital content assets 136 and a specific configuration of the subset of the digital content assets 136 based on the instructions 138 associated with the particular digital content assets package 132 and the size, location, or both, of the digital content slot of the particular electronic document.

In some examples, the digital content slot is associated with one or more presentation sizes (e.g., one or more combinations of height and width). To that end, the instructions 138 for a particular digital content asset package 132 can specify the configuration of the digital content assets 136 for the particular digital content asset package area based on the one or more presentation sizes. Thus, based on the presentation size of the digital content slot of the particular electronic document and the presentation sizes associated with the composite digital content, the composite digital content can be included within the digital content slot of the particular electronic document. For example, the digital content slot is associated with a size of 150 pixels by 150 pixels, and one of the presentation sizes associated with the composite digital content (e.g., as indicated by the instructions 138) is 150 pixels by 150 pixels. Thus, the composite digital content is available for inclusion within the digital content slot.

In some examples, the digital content asset packages 132 each include an identifying element that uniquely identifies the composite digital content. The identifying element can be is based on the appropriate digital content assets 136. For example, the identifying element can indicate the particular subset of digital content assets 136 and/or the positioning (or arrangement) of the digital content assets 136 within a particular electronic document (or a portion of the particular electronic document) of the set of electronic documents.

In some implementations, the server computing system 102, and specifically, the asset package list generator 116, generates a digital content asset package list 134 that specifies an order of presentation of the digital content asset packages 132. Specifically, the order of presentation of the digital content asset packages 132 are an order in which the digital content asset packages 132 are presented on the set of the electronic documents of the composite page 130. The order of presentation of the digital content asset packages 132 can be independent of an order of selection (e.g., by the client computing device 104) of the set of the electronic documents. The order of presentation of the digital content asset packages 132 can be based on one or more parameters associated with the appropriate digital content assets 136 and/or digital content asset packages 132, such as, a source of the digital content assets 136, or resource allocation associated with the digital content assets 136.

In some implementations, in response to the search query 124, the server computing system 102 transmits the composite page 130, the digital content asset packages 132, and the digital content asset package list 134 to the client computing device 104, e.g. over one or more networks. When transmitting the composite page 130 to the client computing device 104 by the server computing system 102, the composite page 130 includes i) snippets of the electronic documents identified as responsive to the search query 124 (e.g., for initial display), and ii) complete portions of the electronic documents, including formatting data (e.g., hidden from initial display). In some examples, the composite page 130 includes a search results page that includes the snippets of the electronic documents (e.g., set of search results) identified as responsive to the search query 124 (e.g., for initial display).

Figure 2:
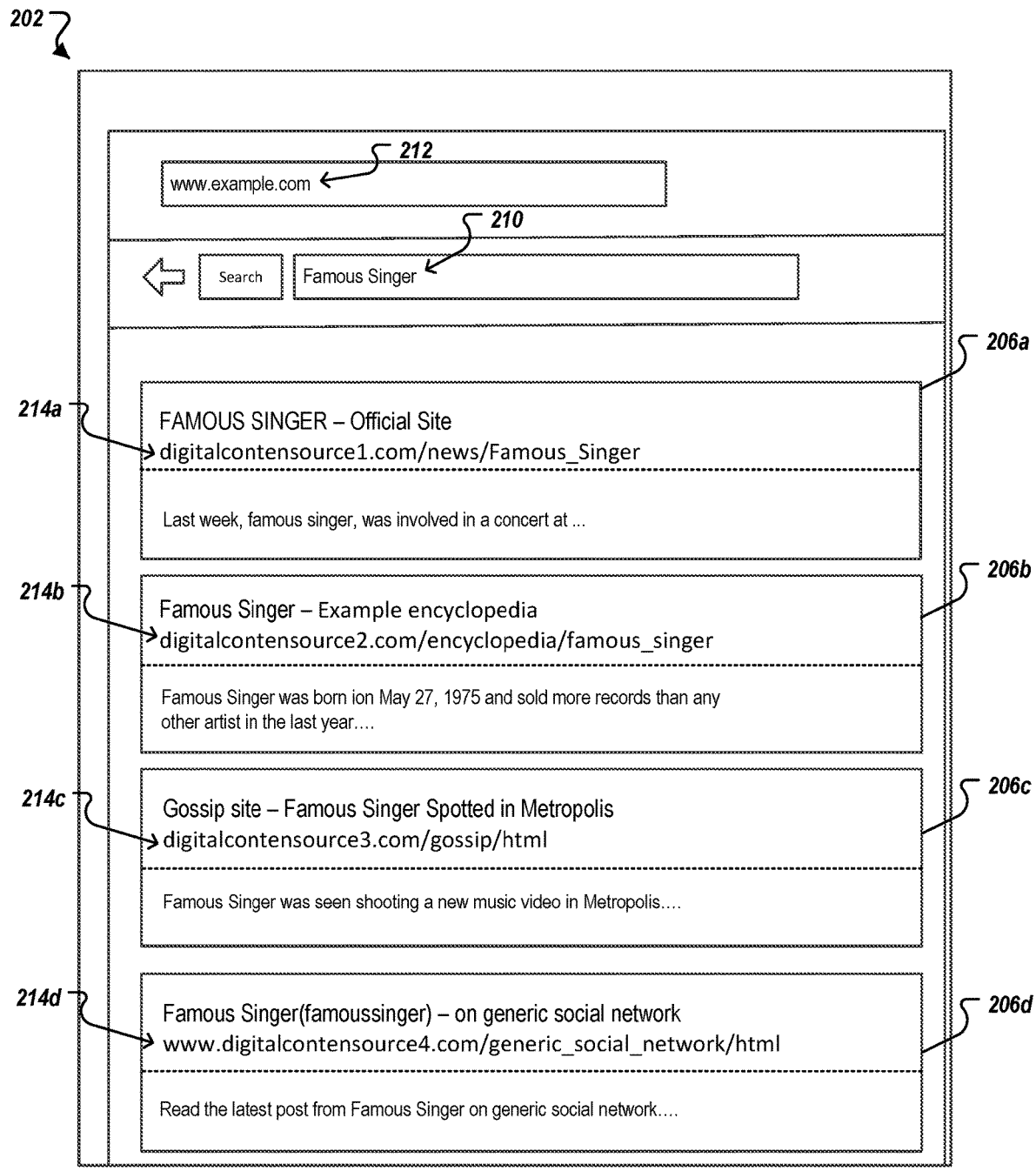
FIG. 2 illustrates an example graphical user interface displaying an example composite page.

FIG. 2 illustrates an example of a composite page 202, similar to the composite page 130 of FIG. 1. The composite page 202 includes search results 206 (shown as search results 206a, 206b, 206c, 206d) that are responsive to the search query 124. In the illustrated example, the search results 206 are responsive to the search query 124 "famous singer" and are based on the electronic document digital content 122 stored by the electronic document repository 106. The search results 206 each include a modified version of the corresponding electronic document digital content 122, including a snippet of the corresponding electronic document digital content 122 (e.g., a headline associated with the electronic document digital content 122, a domain associated with the electronic document digital content 122, and a first textual portion of the corresponding electronic document digital content 122). Furthermore, in the illustrated example, the composite page 202 is hosted at a domain 212 (e.g., example.com) different than domains 214 (shown as domains 214a, 214b, 214c, 214d) that host the electronic document digital content 122 associated with the search results 206 respectively (e.g., digitalcontentsource1.com, digitalcontentsource2.com, digitalcontentsource3.com, digitalcontentsource4.com).

In some implementations, the client computing device 104 detects interaction with one of the search result 206. For example, one of the snippets of the electronic document digital content 122 provided within the composite page 130 is selected, e.g., by a user of the client computing device 104. In response to the selection, the client computing device 104 updates the visualization of the composite page 130 to reveal the electronic document digital content 122 associated with the selected snippet of the electronic document digital content 122. Specifically, the composite page 130 is graphically animated (or altered) to transition from the initial version of the composite page 130 that includes the snippets of the electronic document digital content 122 to an updated version of the composite page 130 that includes the full electronic document digital content 122 associated with the selected snippet of the electronic document digital content 122. Note that this updated version of the composite page 130 can be presented without requiring an additional network call or request for the electronic document digital content 122 being revealed by way of the user interaction. Rather, the electronic document digital content 122 that is already included in the composite page 130 is revealed to the user.

Figure 3:
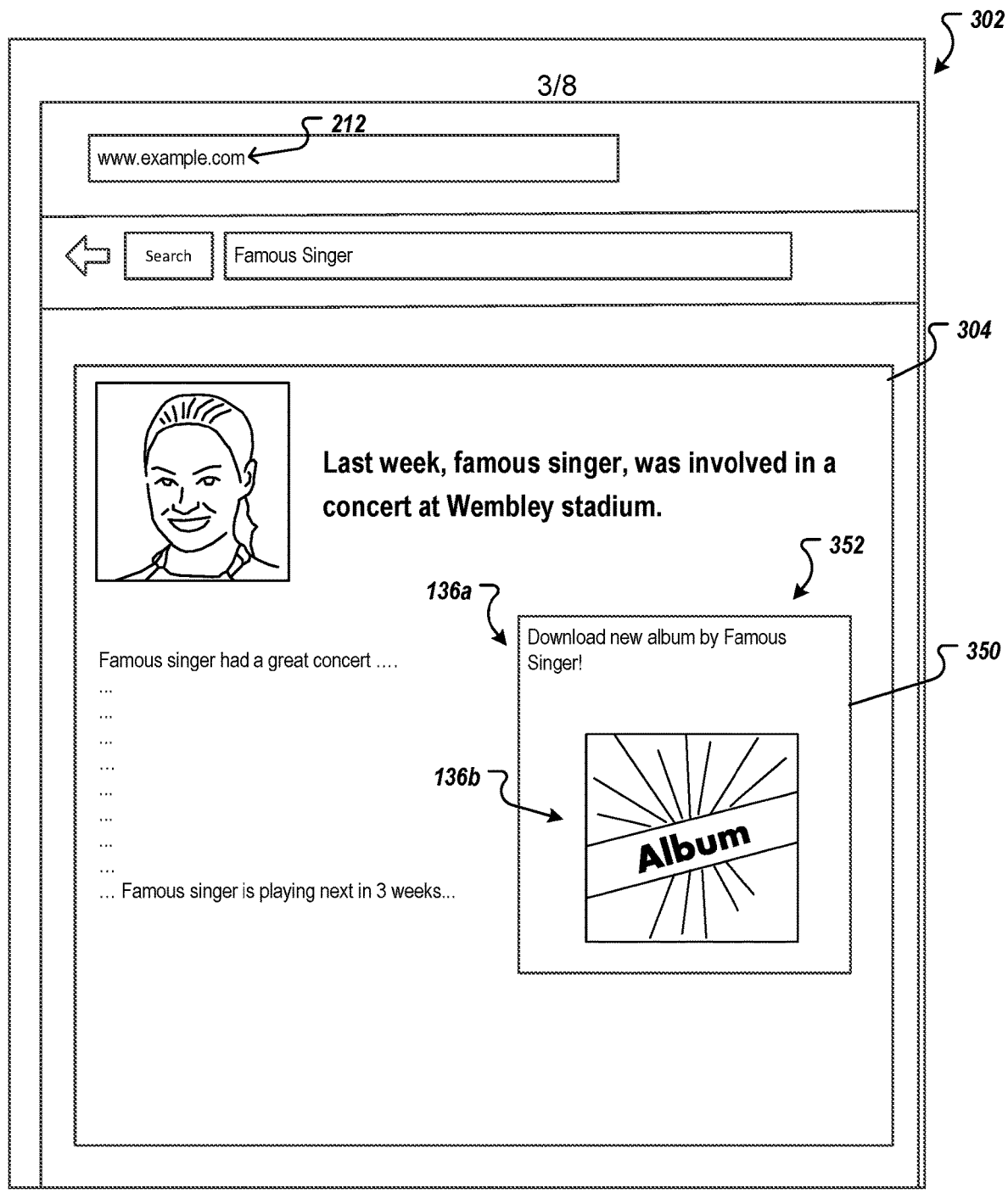
FIGS. 3, 4 illustrates example graphical user interfaces displaying an example composite page including composite digital content.

In some examples, the composite page 130 is updated to reveal the electronic document digital content 122 associated with the selected snippet of the electronic document digital content 122 independent of an additional request for content associated with the electronic document digital content 122. FIG. 3 illustrates an example composite page 302, similar to the composite page 202 of FIG. 2 and the composite page 130 of FIG. 1. Specifically, the composite page 302 is an updated version of the composite page 202 of FIG. 2 that is presented after revealing the full electronic document digital content 122 associated with selected snippet of the electronic document digital content 122. For example, the selected snippet of the electronic document digital content 122 corresponds to the search result 206a, as shown in FIG. 2. In response to the selection of the search result 206a, the composite page 202, of FIG. 2, is updated to reveal the full electronic document digital content 122 associated with the search result 206a, forming the composite page 302. In the illustrated example, the search result 206a corresponds to a news article associated with the search query "famous singer," and in response to the selection of the search result 206a, the full electronic document digital content 122 associated with the search result 206a is revealed, shown as full digital content 304. Additionally, the composite page 302 is hosted at a domain (e.g., example.com), similar to that of the composite page 202, that is different than the domain associated with the full digital content 304 (e.g., digitalcontenstsource1.com).

In some implementations, the composite page 130 is also updated to include a composite digital content 350, as shown by the composite page 302 of FIG. 3. The composite digital content 350 includes appropriate digital content assets 136 in a specific configuration based on the instructions 138 and the size, location, or both, of a digital content slot 352 of the composite page 302. The client computing device 104 identifies one or more parameters of the digital content slot 352 (e.g., size, location, or both) and based on the instructions 138, appropriately selects a particular digital content asset package 132 (per the digital content asset package list 134) that is able to meet the display parameters of the digital content slot 352. Furthermore, the client computing device 104 then appropriately renders the composite digital content 350 within the digital content slot 352 based on the digital content assets 136 and the instructions 138 associated with the selected digital content asset package 132, explained further below. In the illustrated example of FIG. 3, the composite digital content 350 includes a first digital content asset 136a and a second digital content asset 136b of the digital content assets 136, shown in FIG. 1. The first digital content asset 136a includes the text "Download new album by Famous Singer" and the second digital content asset 136b includes an image of the new album. Furthermore, based on the dimensions and location of the digital content slot 352, the first digital content asset 136a is positioned above the second digital content asset 136b.

The transmission of the composite page 130, the digital content asset packages 132, and the digital content asset package list 134 from the server computing system 102 to the client computing device 104 can be performed in a single electronic transmission event. That is, as the initial transmission includes i) the composite page 130 (that includes the full electronic document digital content 122), ii) the digital content asset packages 132, and iii) the digital content asset package list 134, an additional network call or request for the electronic document digital content 122 or the contents of the composite digital content 350 being revealed by way of the user interaction is not needed. Rather, the full electronic document digital content 122 (within the composite page 130), the digital content asset packages 132, and the digital content asset package list 134 is provided during the initial transmission, and upon animating the composite page 130 from the initial version including the snippets of the electronic document digital content 122 (e.g., the search results page), the composite page 130 is updated to include the full electronic document digital content 122 and the composite digital content 350 that was previously provided. As a result, a user (e.g., a user associated with the client computing device 104) remains within a single domain of the composite page 130 (e.g., example.com) while accessing content from multiple domains (e.g., the domains of the electronic document content sources 105 associated with the electronic document digital content 122 of the composite page 130).

In some examples, by providing the full electronic digital content 122 associated with the composite page 130, the digital content asset packages 132, and the digital content asset package 134 list the upon initial transmission of the composite page 130 from the server computing system 102 to the client computing device 104, a number of network round trips between the server computing system 102 and the client computing device 104 is reduced. That is, the full content of the electronic document digital content 122 associated with the composite page 130, the digital content asset packages 132, and the digital content asset package list 134 is transmitted one time from the server computing system 102 to the client computing device 104. Additionally, code libraries used to create the visualization of the composite page 130 can be limited to those provided by the server computing system 102, so that additional code libraries need not be loaded when the full electronic document digital content 122 is revealed. As a result, this reduces the latency of displaying (e.g., revealing) the electronic document digital content 122 that is associated with the selected snippet of the electronic document digital content 122 on a display of the client computing device 104.

Figure 4:
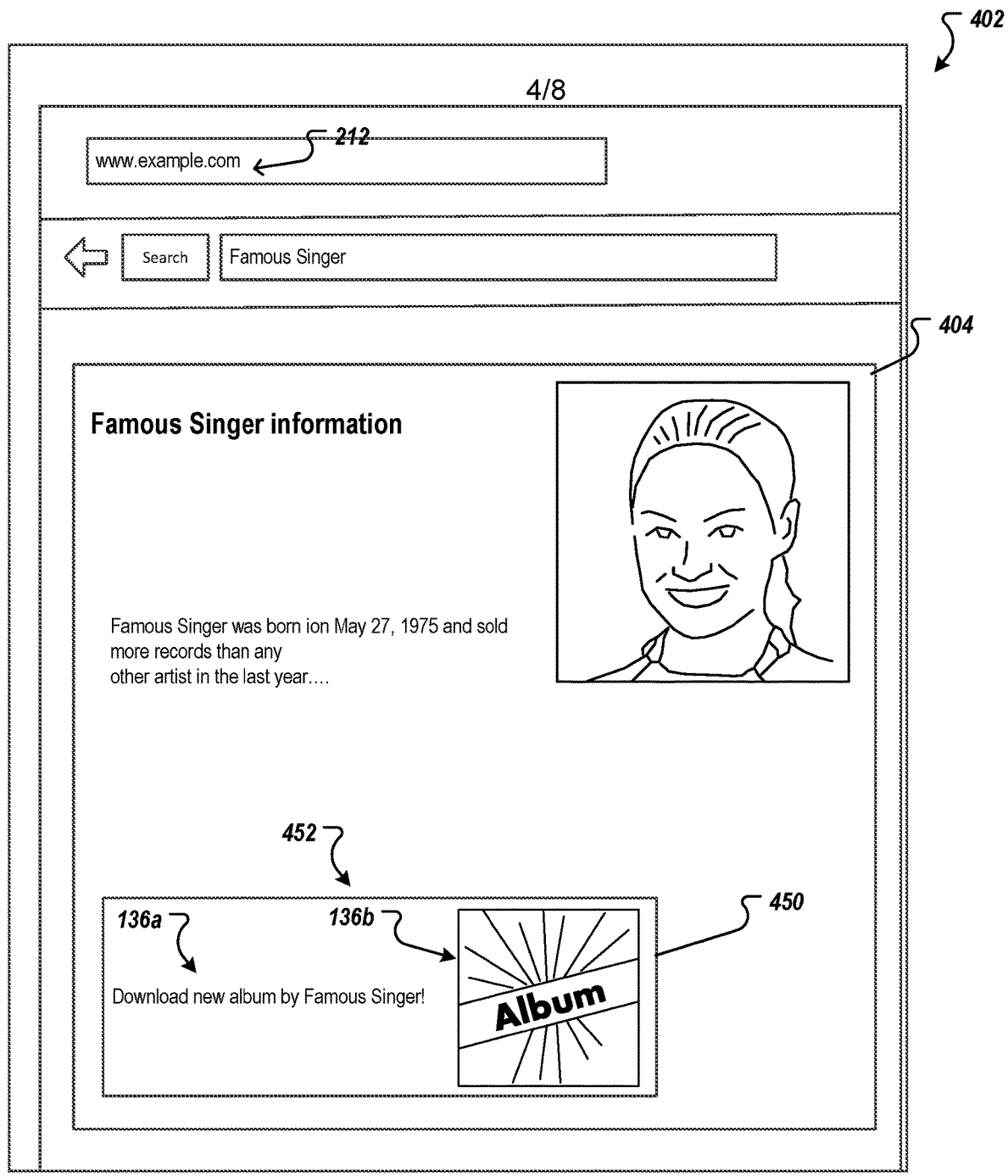

FIG. 4 illustrates an example composite page 402, similar to the composite page 202 of FIG. 2 and the composite page 130 of FIG. 1. The composite page 402 is a different updated version of the composite page 202 of FIG. 2, as compared to the composite page 302 of FIG. 3. Specifically, the composite page 202 is updated to present the composite page 402 after revealing the full electronic document digital content 122 associated with a differing selected snippet of the electronic document digital content 122. For example, the selected snippet of the electronic document digital content 122 corresponds to the search result 206b, as shown in FIG. 2. In response to the selection of the search results 206b, the composite page 202, of FIG. 2, is updated to reveal the full electronic document digital content 122 associated with the search result 206b forming the composite page 402. In the illustrated example, the search result 206b corresponds to an information page associated with the search query "famous singer," and in response to the selection of the search result 206b, the full electronic document digital content 122 associated with the search result 206b is revealed, shown as full electronic document digital content 404. Additionally, the composite page 402 is hosted at a domain (e.g., example.com), similar to that of the composite page 202, that is different than the domain associated with the full electronic document digital content 404 (e.g., digitalcontentsource1.com).

In some implementations, the composite page 130 is also updated to include a composite digital content 450, as shown by the composite page 402 of FIG. 4. The composite digital content 450 that includes appropriate digital content assets 136 in a specification configuration based on the instructions 138 and the size, location, or both, of a digital content slot 452 of the composite page 402 including the composite digital content 450. That is, the client computing device 104 identifies one or more parameters of the digital content slot 452 (e.g., size, location, or both) and based on the instructions 138, appropriately selects a particular digital content asset package 132 (per the digital content asset package list 134) that is able to meet the display parameters of the digital content slot 452. Furthermore, the client computing device 104 then appropriately renders the composite digital content 450 within the digital content slot 452 based on the digital content assets 136 and the instructions 138 associated with the selected digital content asset package 132, explained further below. In the illustrated example of FIG. 4, the composite digital content 450 includes the first digital content asset 136a and the second digital content asset 136b of the digital content assets 136 of FIG.1. The first digital content asset 136a includes the text "Download new album by Famous Singer" and the second digital content asset 136b includes an image of the new album. Furthermore, based on the dimensions and location of the digital content slot 452, the first digital content asset 136a and the second digital content asset 136b are positioned side-by-side.

In the illustrated example, the selected digital content asset package 132 is the same for each of the composite pages 302 and 402. That is, the client computing device 104 selects the same digital content asset package 132 (per the digital content asset package list 134) for each of the composite pages 302 and 402 based on the one or more parameters of the digital content slot 452 (e.g., size, location, or both) and based on the instructions 138. However, for each of the composite pages 302 and 402, the client computing device 102 appropriately renders the composite digital content 350 and 450, respectively, within the digital content slot 352 and 452, respectively, based on the digital content assets 136 and the instructions 138 associated with the selected digital content asset package 132. For example, as mentioned above, each of the composite digital contents 350 and 450 include the first and the second digital content assets 136a, 136b. However, the rendering of the first and the second digital content assets 136a, 136b by the client computing device 104 is based on the dimensions of the respective digital content slots 352, 452 such that the composite digital content 350 includes the first digital content asset 136a positioned above the second digital content asset 136b and the composite digital content 350 includes the first digital content asset 136a and the second digital content asset 136b positioned side-by-side.

Moreover, as mentioned above, the transmission of the composite page 130, the digital content asset packages 132, and the digital content asset package list 134 from the server computing system 102 to the client computing device 104 is performed in a single electronic transmission event. That is, as the initial transmission includes i) the composite page 130 (that includes the full electronic document digital content 122), ii) the digital content asset packages 132, and iii) the digital content asset package list 134, an additional network call or request for the electronic document digital content 122 or the contents of the composite digital content 350 or 450 being revealed by way of the user interaction is not needed. Thus, the client computing device 104 is able to appropriately render the selected digital content asset package 132 independent of which electronic document of the set of electronic documents of the composite page 130 is presented, e.g., independent of whether the composite page 350 or 450 is displayed, without requiring an additional network call or request for contents associated with the digital content asset package 132.

Referring to FIG. 1, in some examples, the server computing device 104 receives, from the client computing device 104, data 170 indicating i) the identifying element of the digital content asset package 132 associated with the composite digital content that was included by the electronic document (e.g., the composite digital content 350 that was included by the composite page 302) and ii) properties of the particular electronic document associated with display of the composite digital content (e.g., properties of the composite digital content 350). For example, the client computing device 102 provides for display the composite digital content 350 within the digital content slot 352. To that end, based on such, the client computing device 104 can transmit the data 170 to the server computing device 102 that identifies i) the particular digital content asset package 132 associated with the composite digital content 350 that was selected and the configuration of the digital content assets 136 within the composite digital content 350 and ii) properties of the digital content slot 352 that included the composite digital content 350. In some examples, the properties can include a size, location, or both of the composite digital content 350.

In some examples, based on receiving the data 170, the server computing system 102 modifies a log. Specifically, the server computing system 102 modifies the log based on the indication of the visual perception of the composite digital content (e.g., the composite digital content 350). In some examples, modifying the log includes updating a database item associated with the composite digital content to indicate that the composite digital content was visually perceptible on the display 150 of the client computing device 104, as described above. In some examples, the aforementioned database item can be associated with the appropriate electronic document content source 105 that is associated with the composite digital content and/or the selected electronic document digital content 122.

FIGS. 5A, 5B illustrate an example process 500 for distribution of digital content assets based on a digital content asset package list. The process 500 can be performed, for example, by the server computing system 102 and/or the mobile computing device 104, or another data processing apparatus. The process 500 can also be implemented as instructions stored on computer storage medium, and execution of the instructions by one or more data processing apparatus cause the one or more data processing apparatus to perform some or all of the operations of the process 500.

The client computing device 104 requests a first electronic document (502). For example, the client computing device 104 requests a first electronic document from the set of electronic documents that are identified as responsive to the search query 124 and that are included by the composite page 140. For example, the user selects one of the search results 206 and requests the corresponding electronic document. The client computing device 104 identifies properties (e.g., associated with the first electronic document) (504). For example, the client computing device 104 identifies properties such as size, location, or both, of a digital content slot within the first electronic document. In the illustrated example, the properties include size parameters, including a width of 100 pixels and a height of 200 pixels of the digital content slot. The client computing device 104 identifies a digital content asset package 2 from a digital content asset package list 550 (506). For example, the digital content asset package list 550 includes an ordered listing of display of three digital content asset packages each associated with requirements for display of such. In the illustrated example, the digital content asset package 1 includes display requirements of a height greater than 250 pixels. Thus, the display requirements of the digital content asset package 1 are not met, and the digital content asset package 1 is not selected by the client computing device 104. However, the display requirements of the digital content asset package 2 are met, and the digital content asset package 2 is selected by the client computing device 104.

The client computing device 104 renders the digital content associated with the digital content asset package 2 (508). For example, the client computing device 104 appropriately renders the digital content assets of the digital content asset package 2 for display within a digital content slot of the first electronic document based on the properties of the first electronic document. The client computing device 104 records a view (e.g., impression or presentation) of the digital content asset package 2 for the digital content slot 5 (510). For example, the client computing device 104 records a view regarding a particular configuration of the digital content assets of the digital content asset package 2 as provided within the digital content slot 5.

The client computing device 104 requests a second electronic document (512). For example, the client computing device 104 requests a second electronic document from the set of electronic documents that are identified as responsive to the search query 124 and that are included by the composite page 140. For example, the user selects one of the search results 206 and requests the corresponding electronic document. The client computing device 104 identifies properties (e.g., associated with the second electronic document) (514). For example, the client computing device 104 identifies properties such as size, location, or both, of a digital content slot within the second electronic document. In the illustrated example, the properties include size parameters, including a width of 150 pixels and a height of 50 pixels of the digital content slot. The client computing device 104 identifies a digital content asset package 3 from a digital content asset package list 550 (516). In the illustrated example, the digital content asset package 1 includes display requirements of a height greater than 250 pixels. Thus, the display requirements of the digital content asset package 1 are not met, and the digital content asset package 1 is not selected by the client computing device 104. Further, the digital content asset package 2 is not selected as it was previously elected for presentation with the first electronic document. After bypassing the digital content asset packages 1 and 2, the digital content asset package 3 is selected by the client computing device 104 as the display requirements of the digital content asset package 3 are met.

The client computing device 104 renders the digital content associated with the digital content asset package 3 (518). For example, the client computing device 104 renders the digital content assets of the digital content asset package 3 for display within a digital content slot of the second electronic document based on the properties of the second electronic document. The client computing device 104 records a view of the digital content asset package 4 for the digital content slot 7 (520). For example, the client computing devices 104 records a view regarding a particular configuration of the digital content assets of the digital content asset package 3 as provided within the digital content slot 7.

Figure 6:
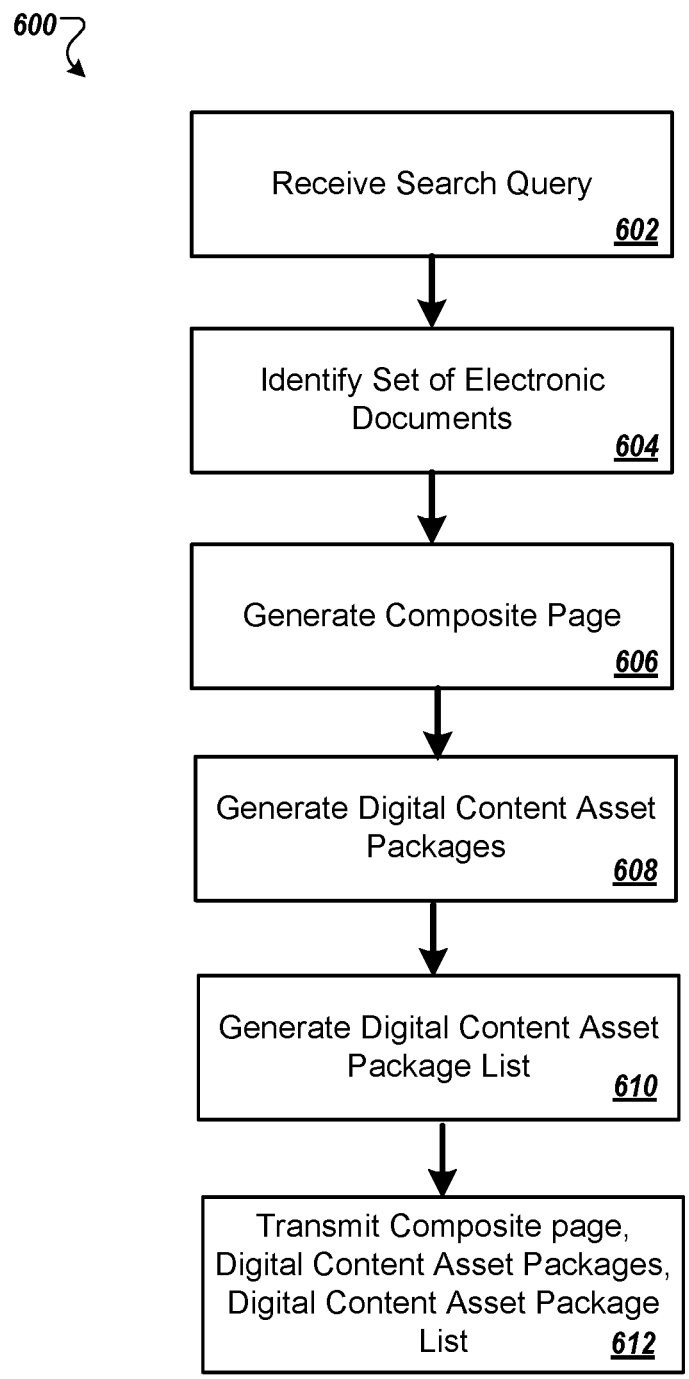
FIG. 6 illustrates an example process for distribution of digital content assets.

FIG. 6 illustrates an example process 600 for distribution of digital content assets. The process 600 can be performed, for example, by the server computing system 102 and/or the client computing device 104, or another data processing apparatus. The process 600 can also be implemented as instructions stored on computer storage medium, and execution of the instructions by one or more data processing apparatus cause the one or more data processing apparatus to perform some or all of the operations of the process 600.

A search query is received (602). For example, with reference to FIG. 1, the server computing system 102 receives a search query 124, e.g., from the client computing device 104, over one or more networks. A set of electronic documents using the search query are identified (604). For example, with reference to FIG. 1, the electronic document inspection device 110 accesses the electronic document digital content 122 stored by the electronic document repository 108 (and that was obtained from the electronic document content sources 105) to identify a set of electronic documents that are response to the search query 124. A composite page is generated (606). For example, with reference to FIG. 1, the server computing system 102, and in particular, the composite page generator 112 generates a composite page 130. In some examples, the composite page i) is hosted by a different domain than at least some electronic documents in the set of electronic documents and ii) includes various electronic documents from the set of electronic documents. That is, the composite page 130 can be hosted at a domain (e.g., example.com) that differs from the domains associated with the set of the electronic documents (e.g., domains associated with the electronic document content sources 106)

Digital content asset packages are generated (608). For example, with reference to FIG. 1, the digital content asset package generator 114, generates digital content asset packages 132. In some examples, each digital content asset package includes i) digital content assets and ii) one or more instructions that specify a configuration of the digital content assets for the respective digital content asset package. For example, the digital content asset package generator 114 accesses the digital content asset repository 108 to identify the digital content assets 136. Furthermore, the instructions specifically the configuration of the digital content assets 136 for i) selection of a subset of the digital content assets 136 (in some examples, including each of the digital content assets 136) and ii) positioning (or arrangement) of the digital content assets 136 within a particular electronic document (or a portion of the particular electronic document) of the set of electronic documents. A digital content asset package list is generated (610). For example, with reference to FIG. 1, the asset packing list generator 116, generates a digital content asset package list 134. In some examples, a digital content asset package list that specifies an order of presentation of the one or more digital content asset packages. For example, the order of presentation of the digital content asset packages 132 are an order for which the digital content asset packages 132 are to be presented on the set of the electronic documents independent of an order on presentation or selection (e.g., by the client computing device 104).

The composite page, the one or more digital content asset packages, and the digital content asset package list are transmitted to the client computing device (612). For example, with reference to FIG. 1, the server computing system 102 transmits the composite page 130, the digital content asset packages 132, and the digital content asset package list 134 to the client computing device 104, e.g. over one or more networks.

Figure 7:
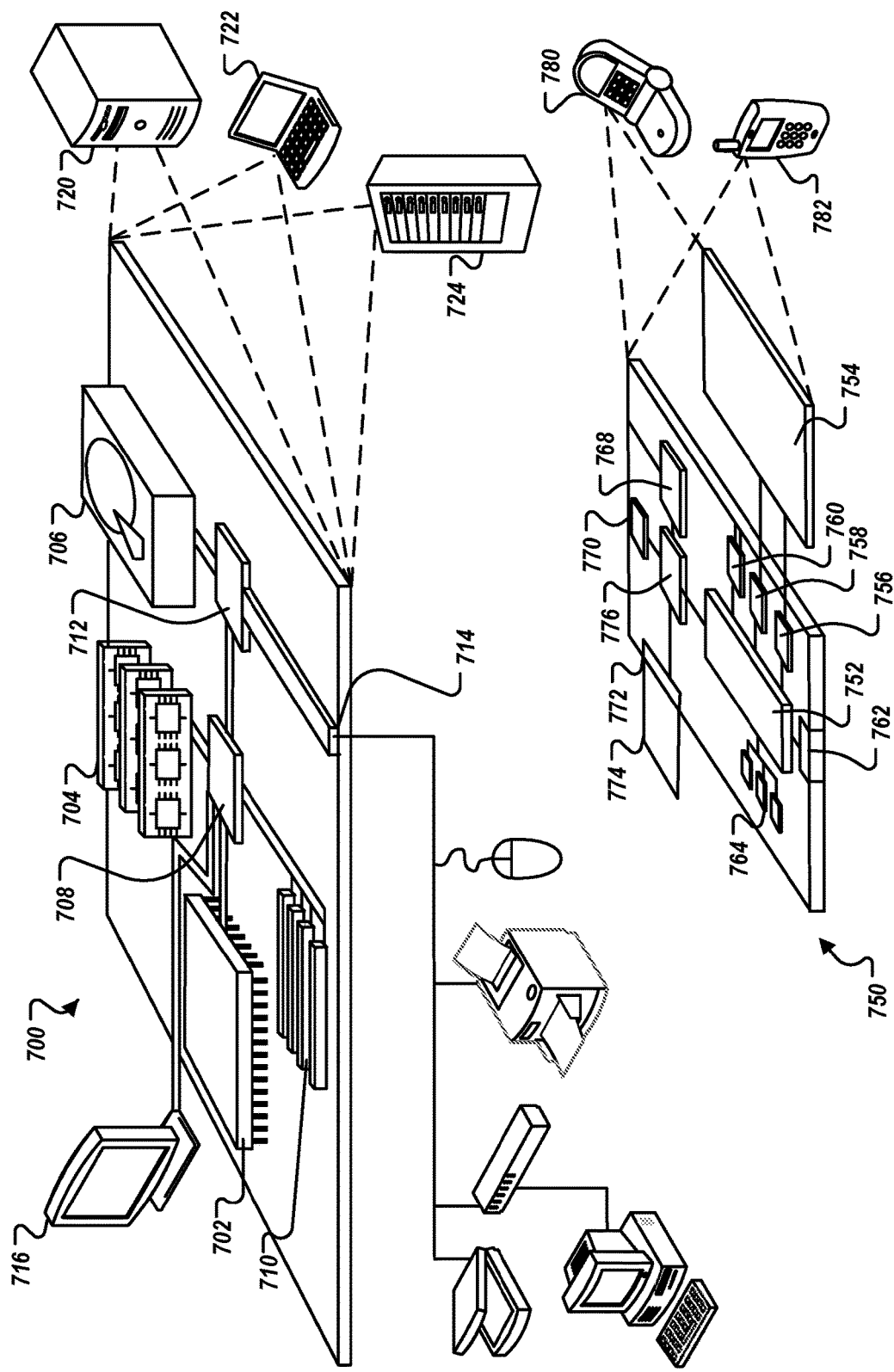
FIG. 7 illustrates an example computing system and mobile computing device that may be used to implement the techniques described herein.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 may process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 704, the storage device 706, or a memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 may execute instructions within the computing device 640, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 648 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 may be implemented as one or more of a computer-readable medium or media, a volatile memory unit or units, or a non-volatile memory unit or units. Expansion memory 754 may also be provided and connected to device 750 through expansion interface 752, which may include, for example, a SIMM (Single In Line Memory Module) card interface. Such expansion memory 754 may provide extra storage space for device 750, or may also store applications or other information for device 750. Specifically, expansion memory 754 may include instructions to carry out or supplement the processes described above, and may include secure information also. Thus, for example, expansion memory 754 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 754, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 750 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system comprising:
  an electronic document inspection device that identifies a set of electronic documents using a search query;
  a composite page generator that generates a composite search results page that i) is hosted by a different domain than electronic documents in the set of electronic documents ii) includes the electronic documents from the set of electronic documents, iii) presents a set of search results that include hyperlinks to the electronic documents, and iv) hides presentation of the electronic documents in the composite search results page until user interaction with the set of search results presented in the composite search results page;
  an asset package generator that generates one or more digital content asset packages, each digital content asset package including i) digital content assets ii) one or more instructions that specify a configuration of the digital content assets for presentation of the digital content assets on the electronic documents when the electronic documents are revealed, and iii) an identifying element that uniquely identifies a composite digital content that is based on one or more of the respective digital content assets; and
  an asset package list generator that generates a digital content asset package list that specifies an order of presentation of the digital content assets on the electronic documents as the electronic documents are revealed in the composite search result page and replace the set of search results in the composite search results page at a given client device in response to user interaction with search results from the set of search results presented in the composite search results page, wherein the composite search results page, the one or more digital content asset packages, and the digital content asset package list are transmitted together to a given user device that provides the search query.

2. The system of claim 1, wherein, for each digital content asset package, the one or more instructions that specify the configuration of the digital content assets are based on a size, a location, or both, of a digital content slot of a particular electronic document of the set of electronic documents that includes a composite digital content that is based on one or more of the respective digital content assets.

3. The system of claim 1, wherein, for each digital content asset package, the one or more instructions that specify the configuration of the digital content assets include a set of one or more presentation sizes that a composite digital content based one or more of the respective digital content assets is available for inclusion within a digital content slot of a particular electronic document of the set of electronic documents.

4. A method comprising:
receiving, by one or more servers and from a given client device, a search query;
identifying, by the one or more servers, a set of electronic documents using the search query;
generating, by the one or more servers, a composite search results page that i) is hosted by a different domain than at least some electronic documents in the set of electronic documents ii) includes various electronic documents from the set of electronic documents, iii) presents a set of search results that include hyperlinks to the electronic documents, and iv) hides presentation of the electronic documents in the composite search results page until user interaction with the set of search results presented in the composite search results page;
generating, by the one or more servers, one or more digital content asset packages, each digital content asset package including i) digital content assets ii) one or more instructions that specify a configuration of the digital content assets for presentation of the digital content assets on the electronic documents when the electronic documents are revealed, and iii) an identifying element that uniquely identifies a composite digital content that is based on one or more of the respective digital content assets;
generating, by the one or more servers, a digital content asset package list that specifies an order of presentation of the digital content assets on the electronic documents as the electronic documents are revealed in the composite search result page and replace the set of search results in the composite search results page at the given client device in response to user interaction with search results from the set of search results presented in the composite search results page; and
in response to the search query, transmitting, by the one or more servers and to the given client device, the composite search results page, the one or more digital content asset packages, and the digital content asset package list.

5. The method of claim 4, wherein, for each digital content asset package, the one or more instructions that specify the configuration of the digital content assets are based on a size, a location, or both, of a digital content slot of a particular electronic document of the set of electronic documents that includes a composite digital content that is based on one or more of the respective digital content assets.

6. The method of claim 4, wherein, for each digital content asset package, the one or more instructions that specify the configuration of the digital content assets include a set of one or more presentation sizes that a composite digital content based one or more of the respective digital content assets is available for inclusion within a digital content slot of a particular electronic document of the set of electronic documents.

7. The method of claim 4, wherein each digital content asset package further includes an identifying element that uniquely identifies a composite digital content that is based on one or more of the respective digital content assets.

8. The method of claim 7, further comprising:
receiving, by the one or more servers and from the given client device, data indicating i) the identifying element and ii) one or more properties of a particular electronic document of the set of electronic documents associated with a display of the composite digital content.

9. The method of claim 8, wherein the one or more properties include a size, location, or both, of the composite digital content that is included within a digital content slot of the particular electronic document.

10. The method of claim 8, further comprising modifying a log based on receiving the data indicating i) the identifying element and ii) the one or more properties of the particular electronic document associated with the display of the composite digital content.

11. A non-transitory computer-readable medium storing software comprising instructions executable by one or more computers which, upon such execution, cause the one or more computers to perform operations comprising:
receiving, from a given client device, a search query;
identifying a set of electronic documents using the search query;
generating a composite search results page that i) is hosted by a different domain than at least some electronic documents in the set of electronic documents and ii) includes various electronic documents from the set of electronic documents, iii) presents a set of search results that include hyperlinks to the electronic documents, and iv) hides presentation of the electronic documents in the composite search results page until user interaction with the set of search results presented in the composite search results page;
generating one or more digital content asset packages, each digital content asset package including i) digital content assets ii) one or more instructions that specify a configuration of the digital content assets for presentation of the digital content assets on the electronic documents when the electronic documents are revealed, and iii) an identifying element that uniquely identifies a composite digital content that is based on one or more of the respective digital content assets;
generating a digital content asset package list that specifies an order of presentation of the digital content assets on the electronic documents as the electronic documents are revealed in the composite search result page and replace the set of search results in the composite search results page at the given client device in response to user interaction with search results from the set of search results presented in the composite search results page; and
in response to the search query, transmitting, to the given client device, the composite search results page, the one or more digital content asset packages, and the digital content asset package list.

12. The computer-readable medium of claim 11, wherein, for each digital content asset package, the one or more instructions that specify the configuration of the digital content assets are based on a size, a location, or both, of a digital content slot of a particular electronic document of the set of electronic documents that includes a composite digital content that is based on one or more of the respective digital content assets.

13. The computer-readable medium of claim 11, wherein, for each digital content asset package, the one or more instructions that specify the configuration of the digital content assets include a set of one or more presentation sizes that a composite digital content based one or more of the respective digital content assets is available for inclusion within a digital content slot of a particular electronic document of the set of electronic documents.

14. The computer-readable medium of claim 13, the operations further comprising:
receiving, from the given client device, data indicating i) the identifying element and ii) one or more properties of a particular electronic document of the set of electronic documents associated with a display of the composite digital content.

15. The computer-readable medium of claim 14, wherein the one or more properties include a size, location, or both, of the composite digital content that is included within a digital content slot of the particular electronic document.

16. The computer-readable medium of claim 14, the operations further comprising modifying a log based on receiving the data indicating i) the identifying element and ii) the one or more properties of the particular electronic document associated with the display of the composite digital content.

* * * * *